(12) United States Patent
Iguchi

(10) Patent No.: US 11,586,037 B2
(45) Date of Patent: Feb. 21, 2023

(54) OPTICAL ELEMENT AND OPTICAL SCANNING DEVICE

(71) Applicant: Nidec Corporation, Kyoto (JP)

(72) Inventor: Takuro Iguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 246 days.

(21) Appl. No.: 17/015,907

(22) Filed: Sep. 9, 2020

(65) Prior Publication Data

US 2021/0088779 A1 Mar. 25, 2021

(30) Foreign Application Priority Data

Sep. 25, 2019 (JP) .............................. JP2019-174628

(51) Int. Cl.
*G02B 26/12* (2006.01)

(52) U.S. Cl.
CPC ......... *G02B 26/125* (2013.01); *G02B 26/123* (2013.01); *G02B 26/124* (2013.01)

(58) Field of Classification Search
None
See application file for complete search history.

(56) References Cited

U.S. PATENT DOCUMENTS

| 8,203,702 B1* | 6/2012 | Kane | G02B 26/0833 356/139.05 |
| 2003/0197910 A1* | 10/2003 | Witt | G02B 7/1821 359/200.7 |
| 2012/0170095 A1* | 7/2012 | Dolleris | G02B 7/1821 359/212.2 |
| 2012/0257268 A1 | 10/2012 | Hino et al. | |

* cited by examiner

*Primary Examiner* — Jennifer D. Carruth
(74) *Attorney, Agent, or Firm* — Keating & Bennett

(57) ABSTRACT

An optical element includes a plate portion including a reflecting surface on an upper surface in a direction of a vertically extending central axis, a shaft that extends in a direction of a first axis intersecting with the central axis and is fixed to a lower surface of the plate portion, a magnet below the shaft in the direction of the central axis, and a holder below the plate portion to hold the magnet, the holder including a magnet accommodating portion in which the magnet is accommodated, the magnet accommodating portion including a magnet pressing portion that covers at least a portion of a lower surface of the accommodated magnet.

8 Claims, 15 Drawing Sheets

[Fig. 1]
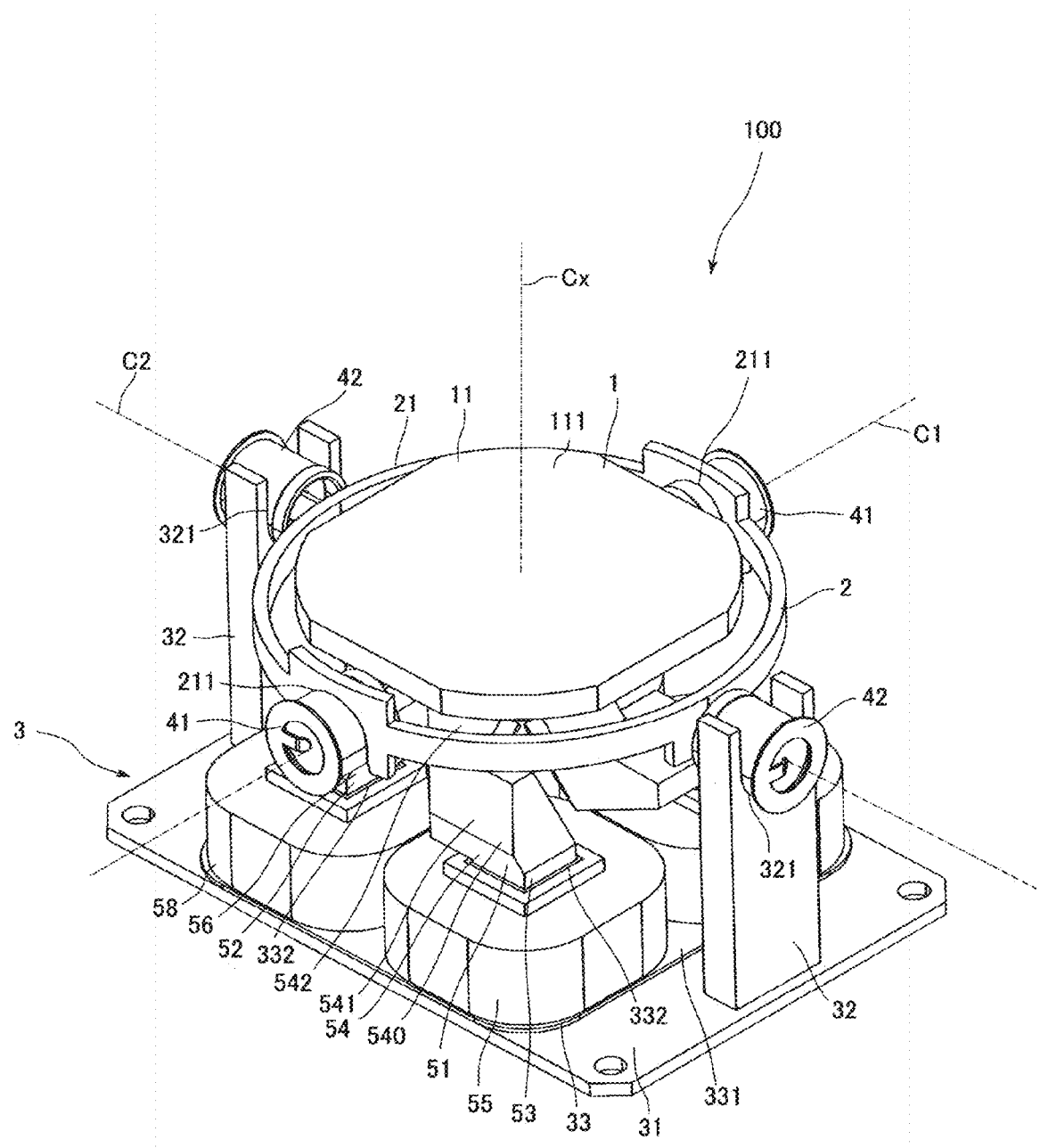

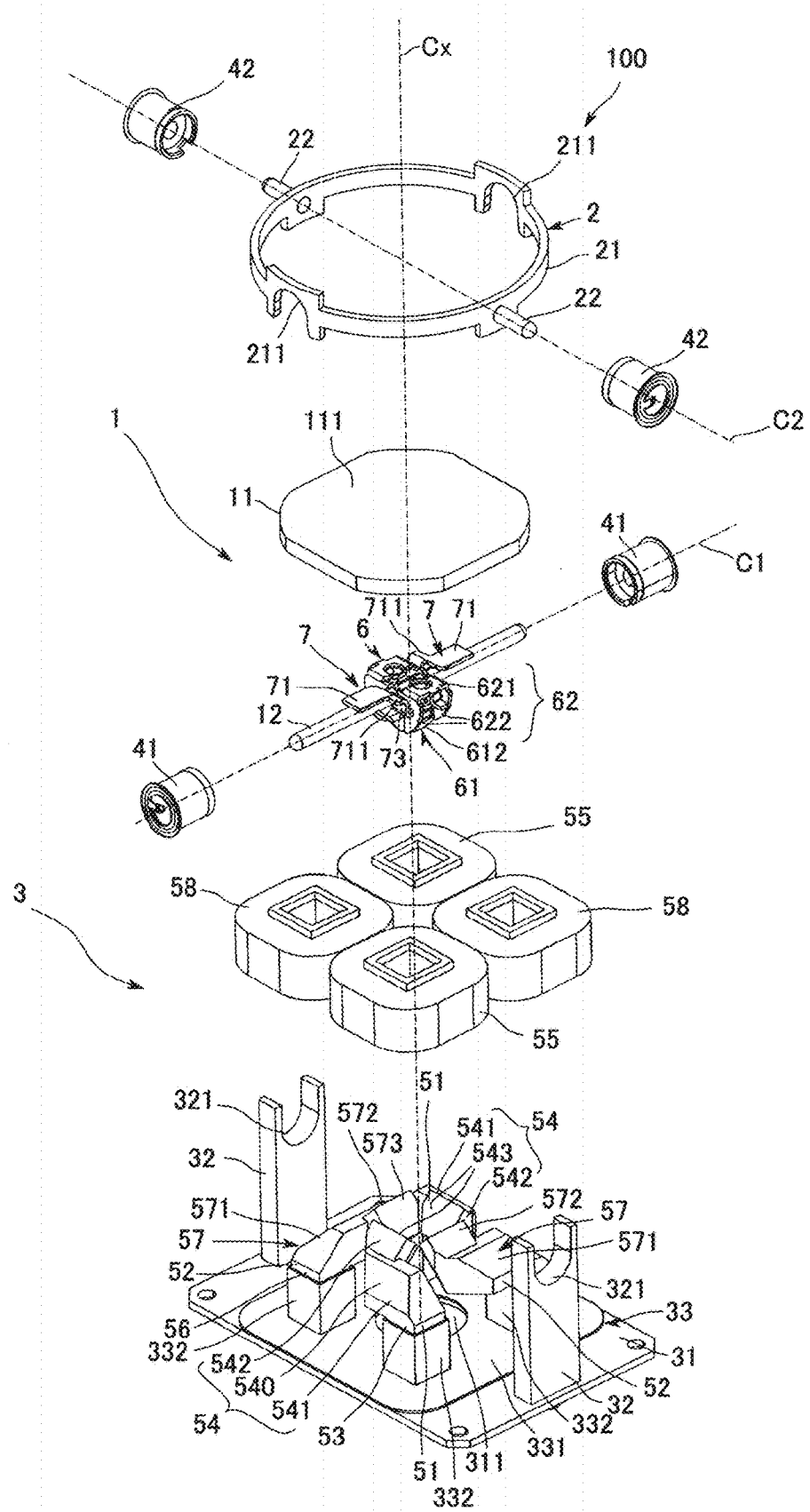
[Fig. 2]

[Fig. 3]
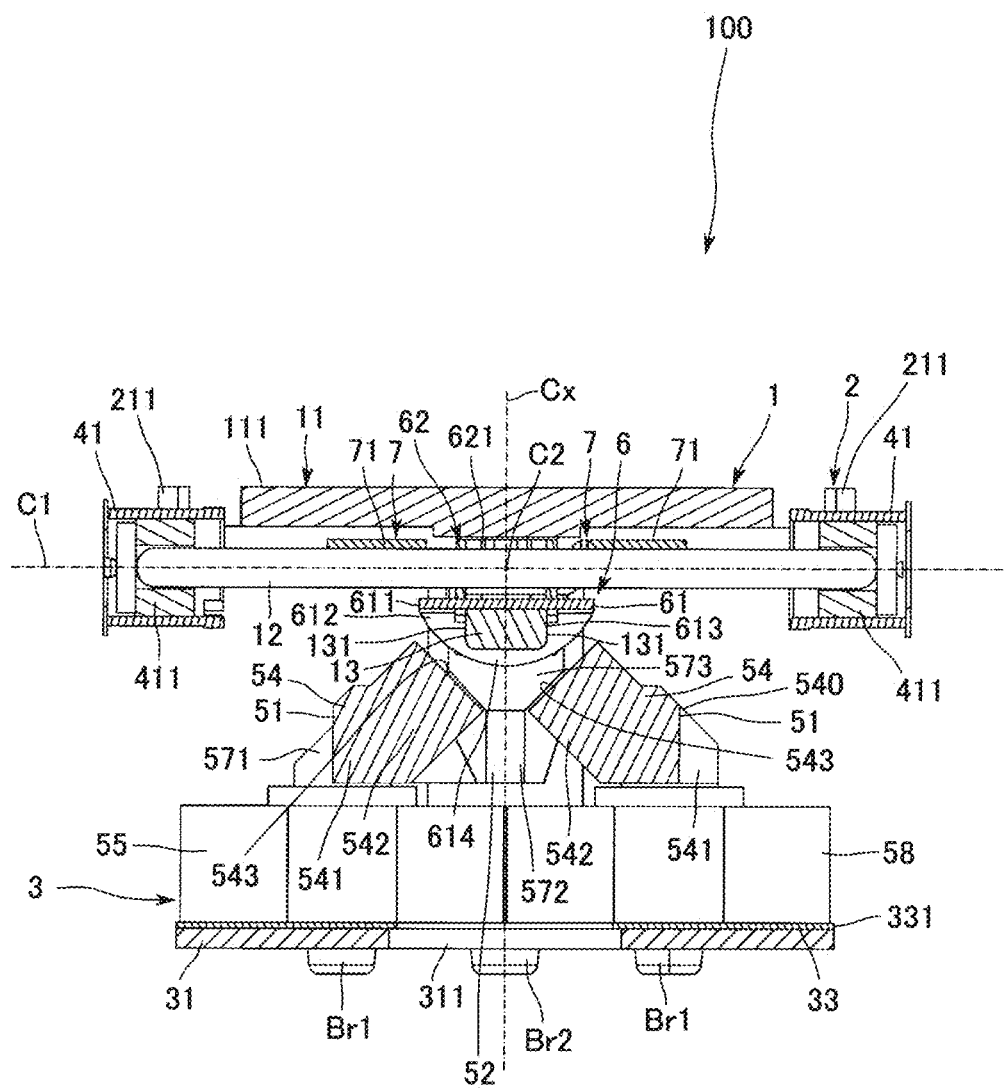

【Fig. 4】
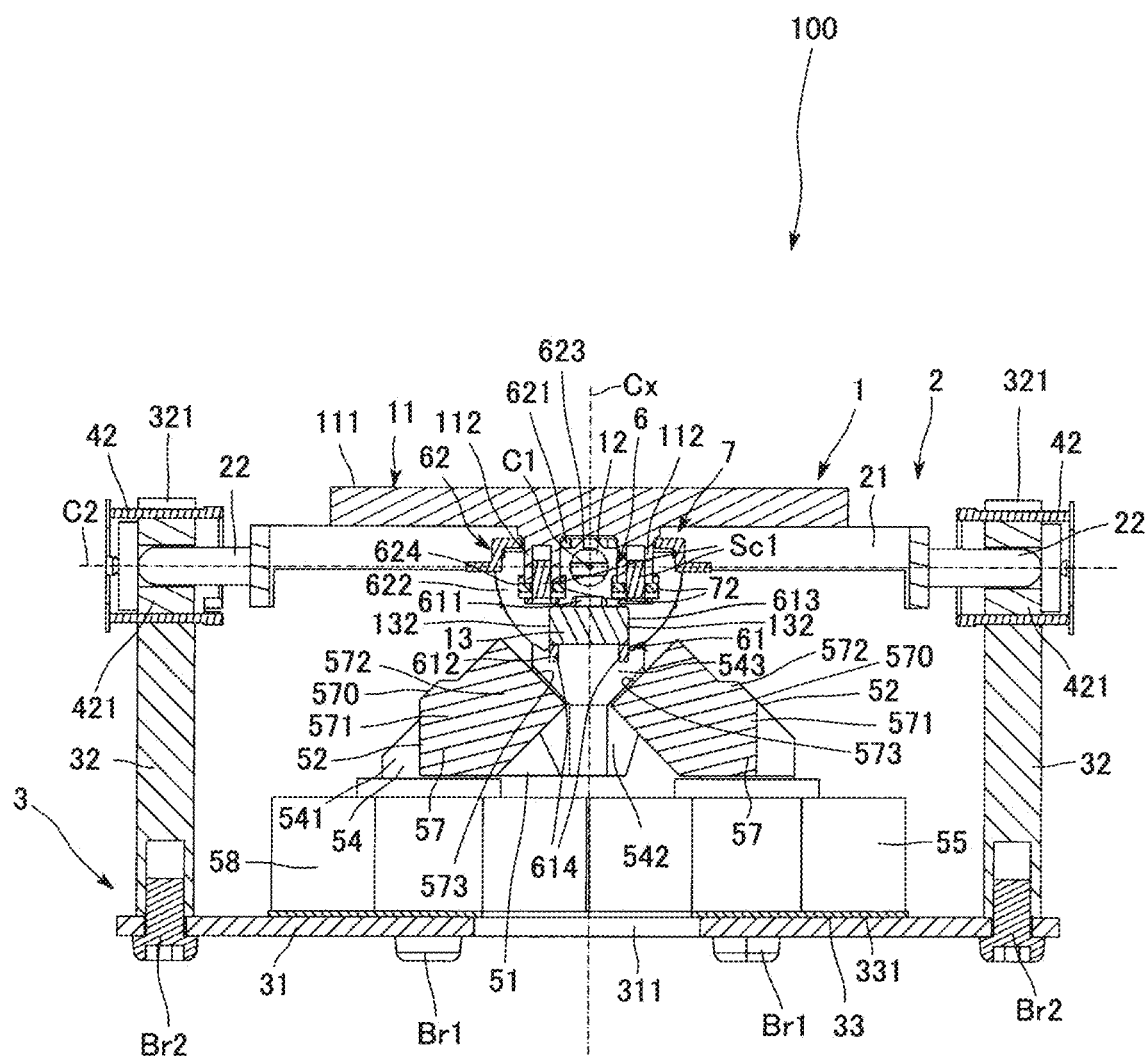

[Fig. 5]
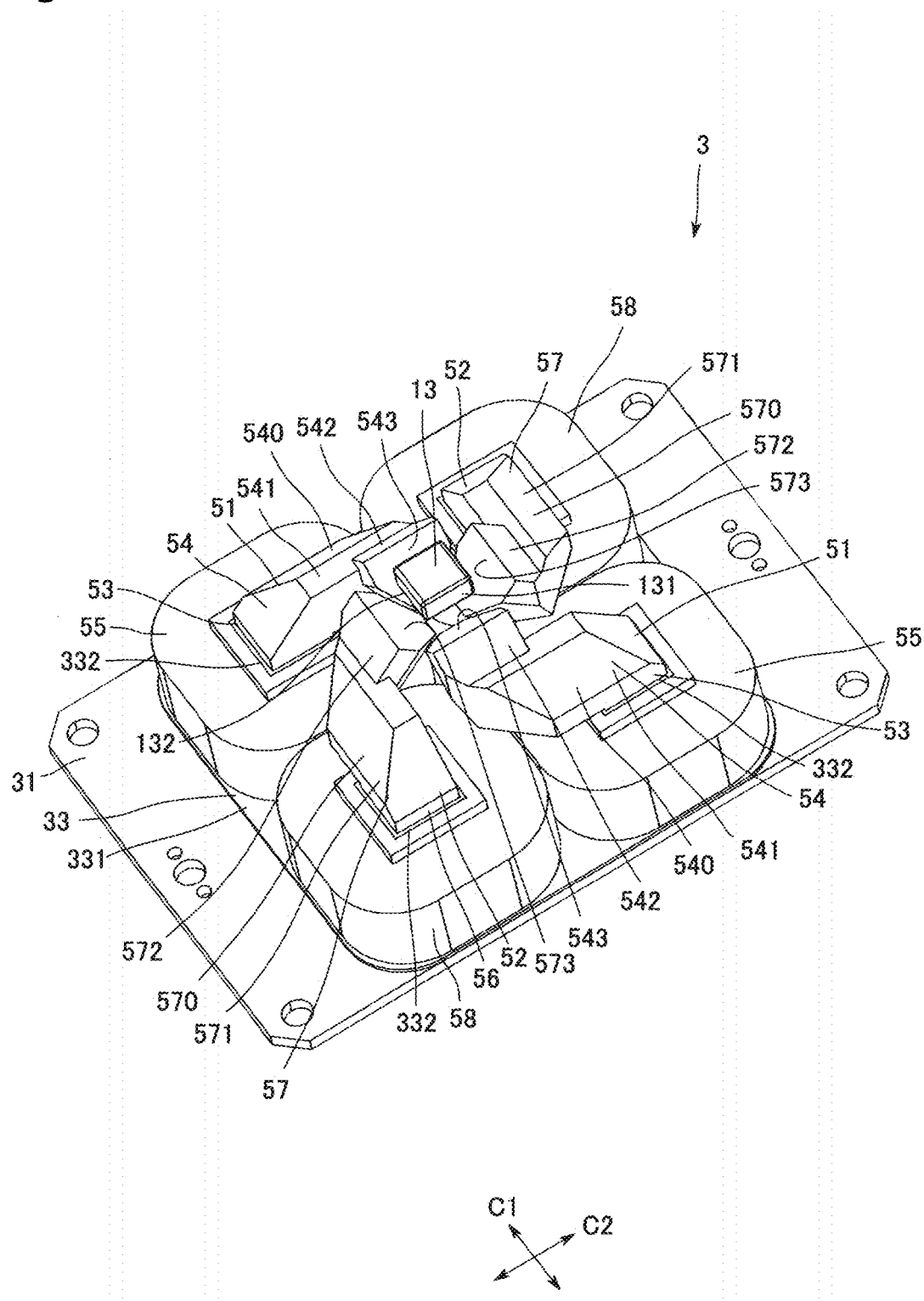

[Fig. 6]
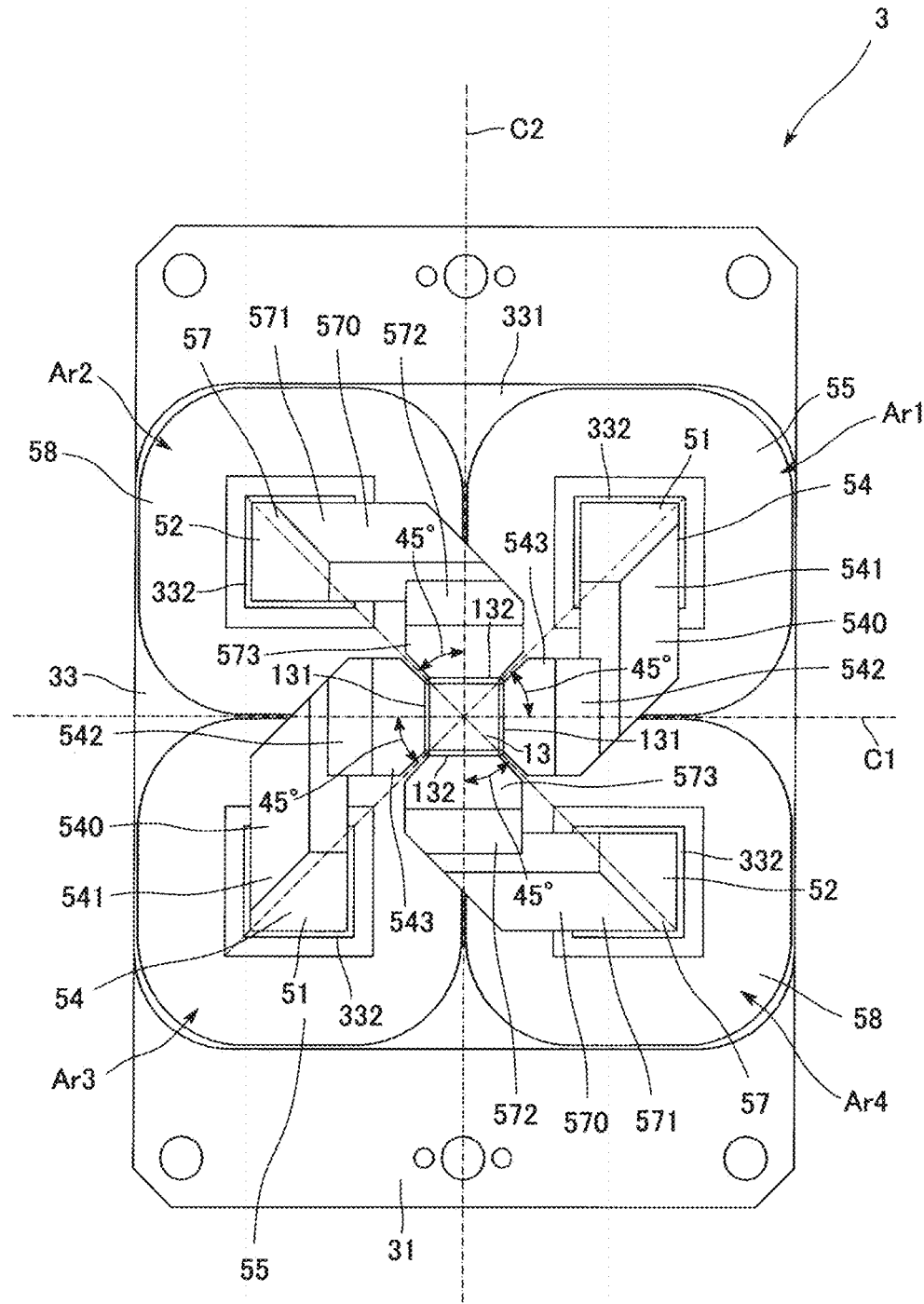

[Fig. 7]
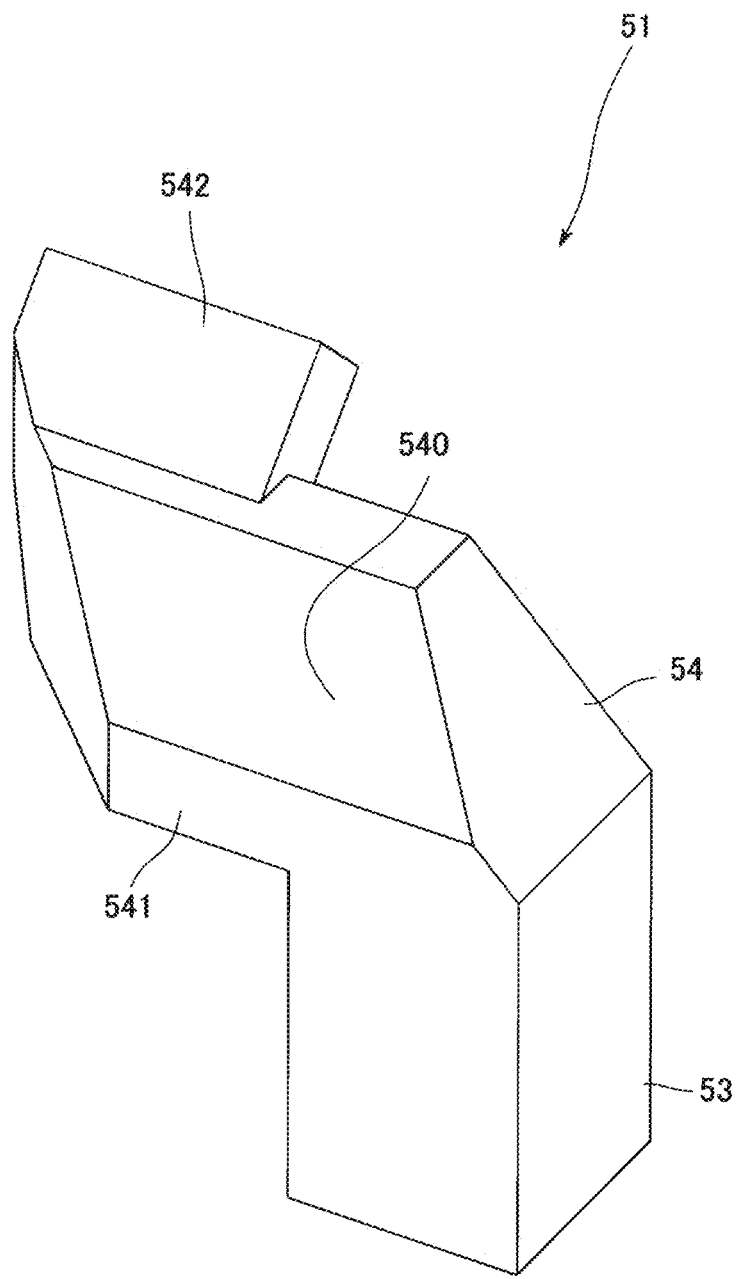

[Fig. 8]
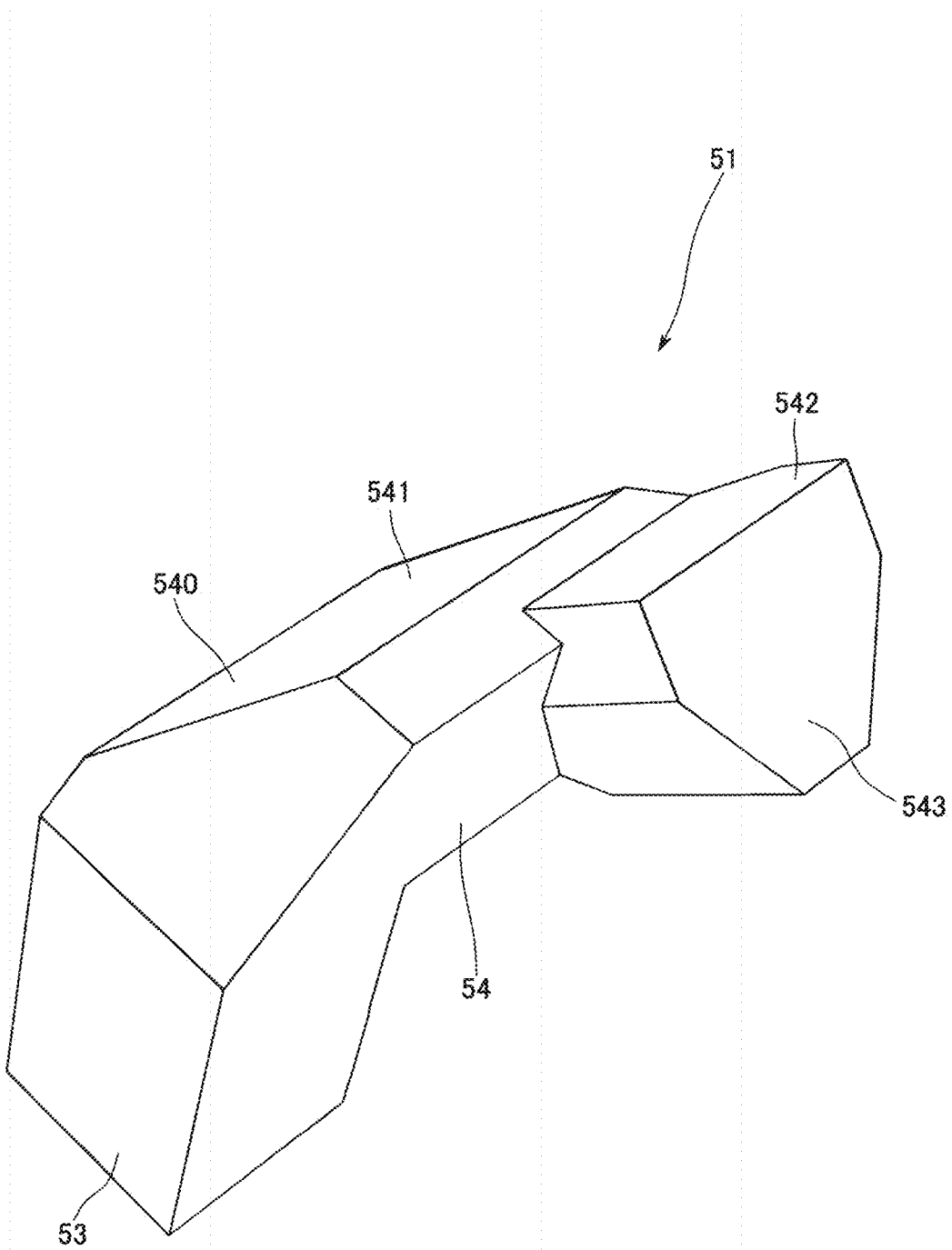

[Fig. 9]
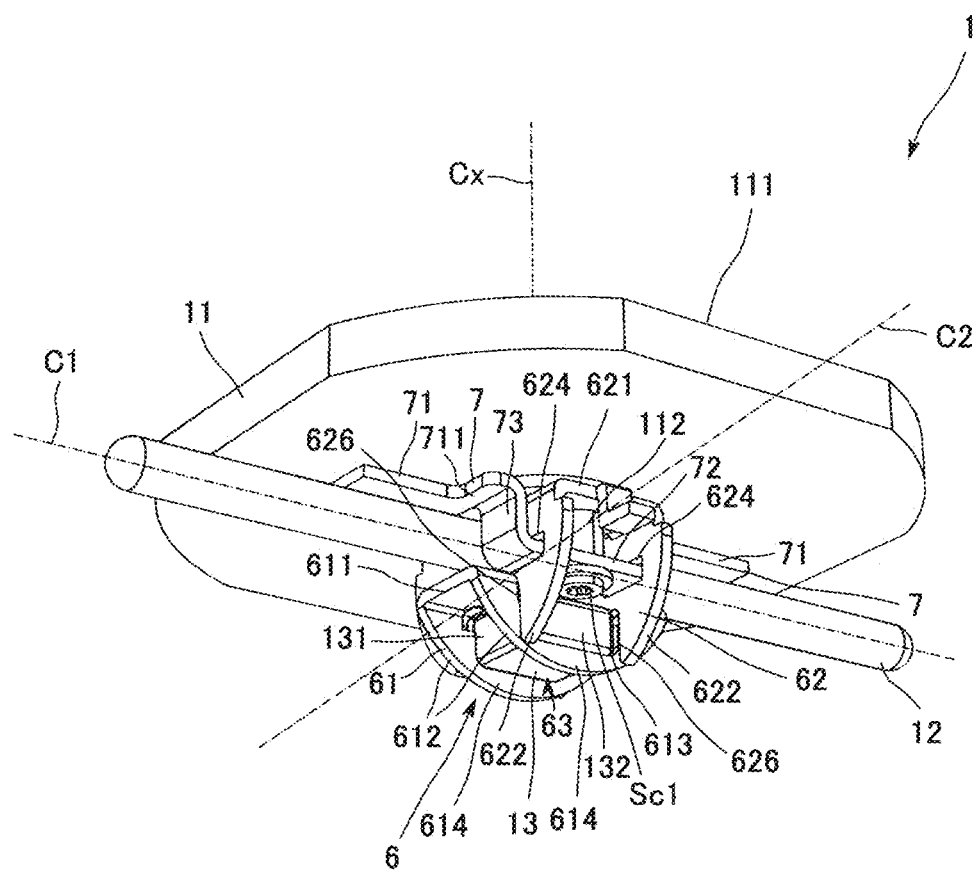

[Fig. 10]
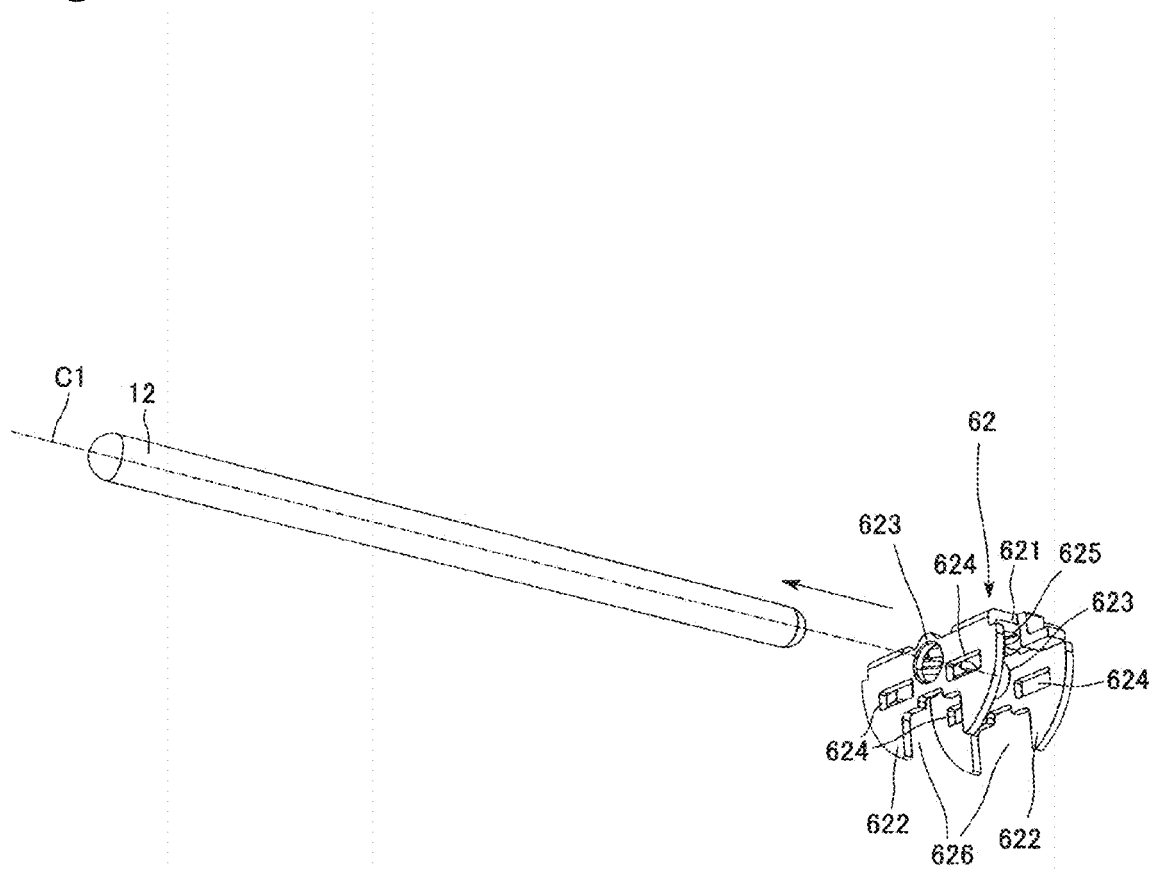

[Fig. 1 1]
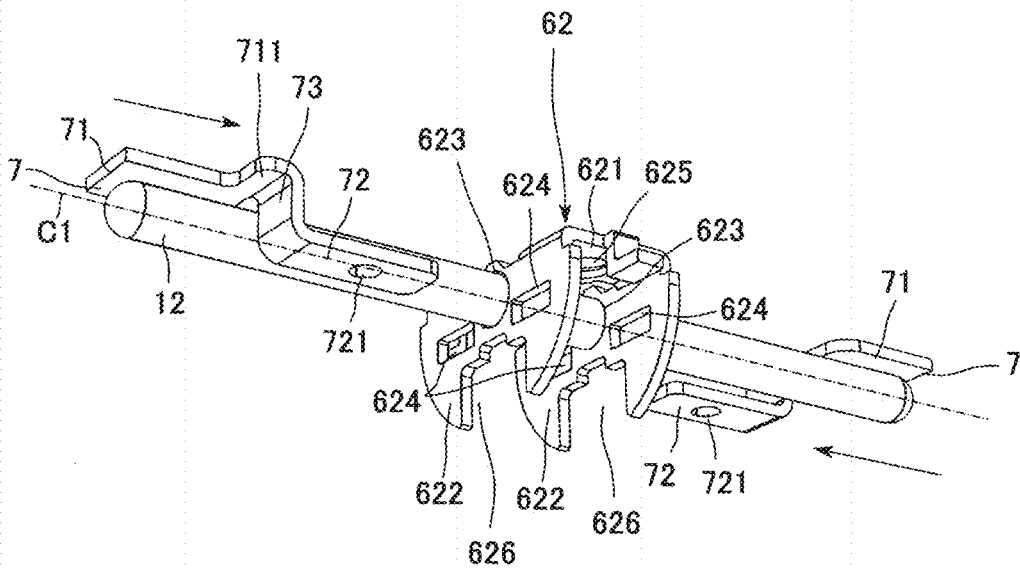

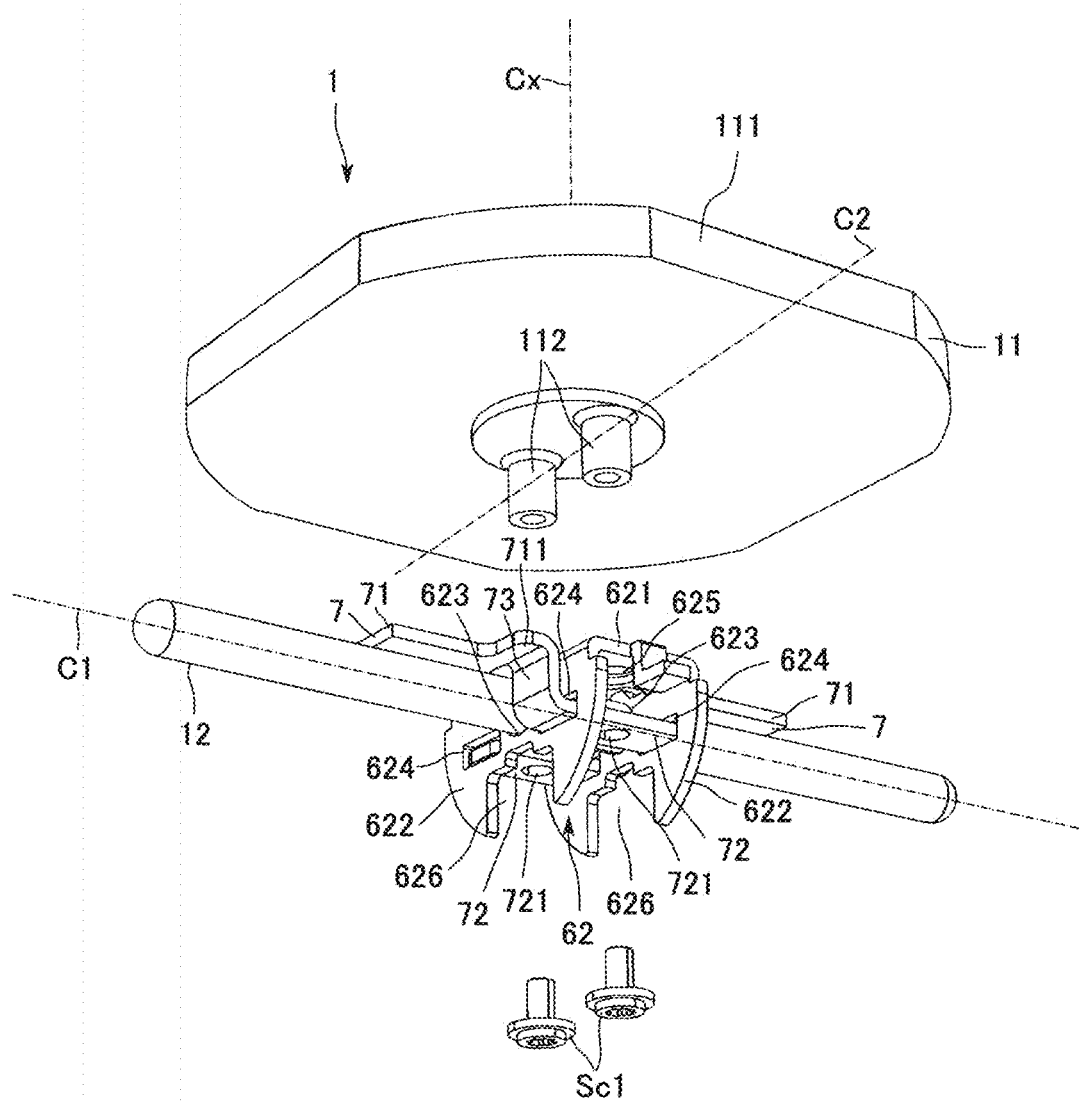
[Fig. 1 2]

[Fig. 1 3]
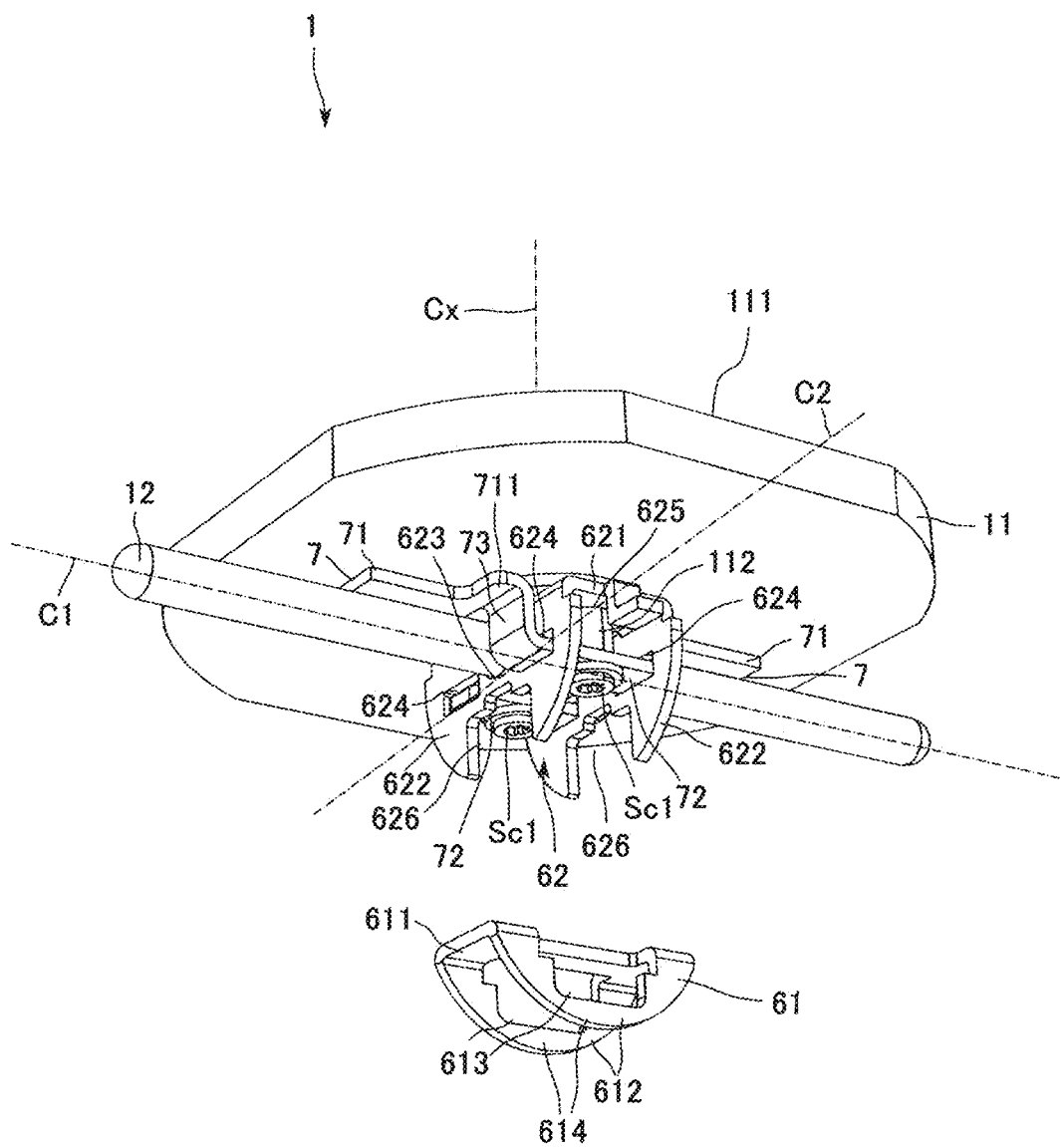

[Fig. 14]
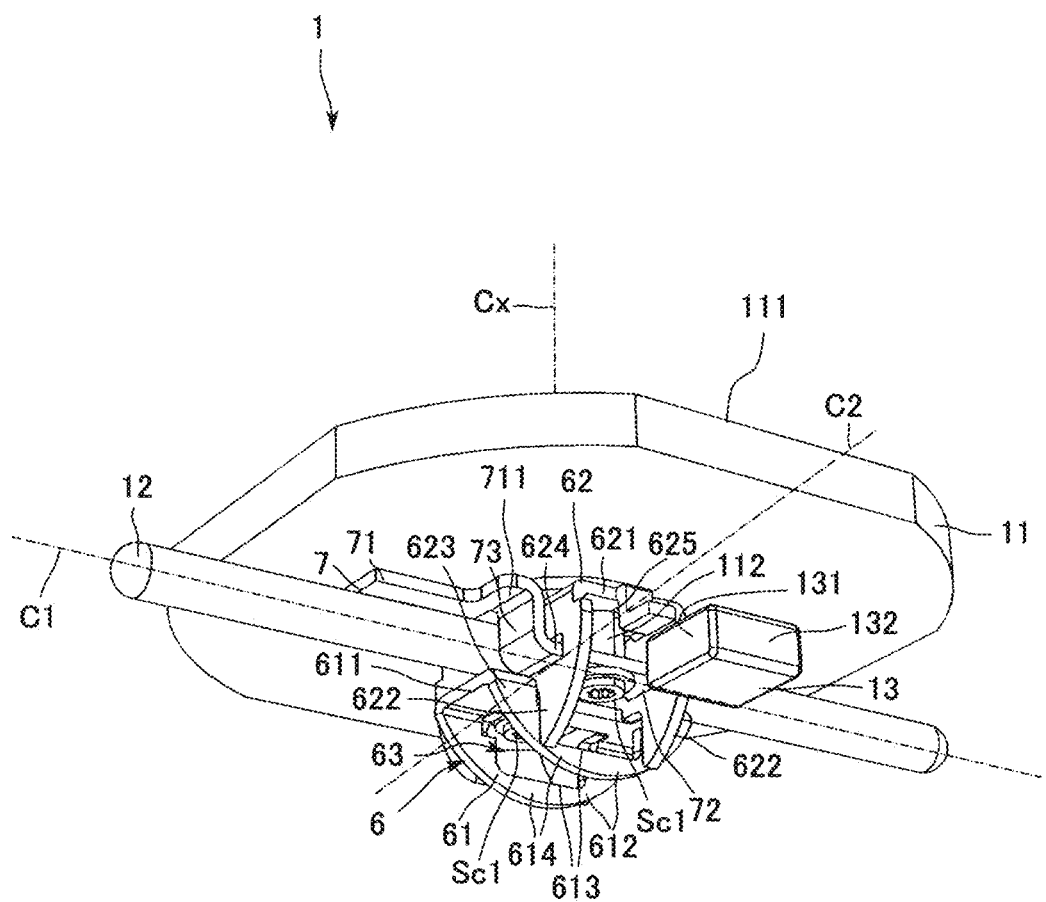

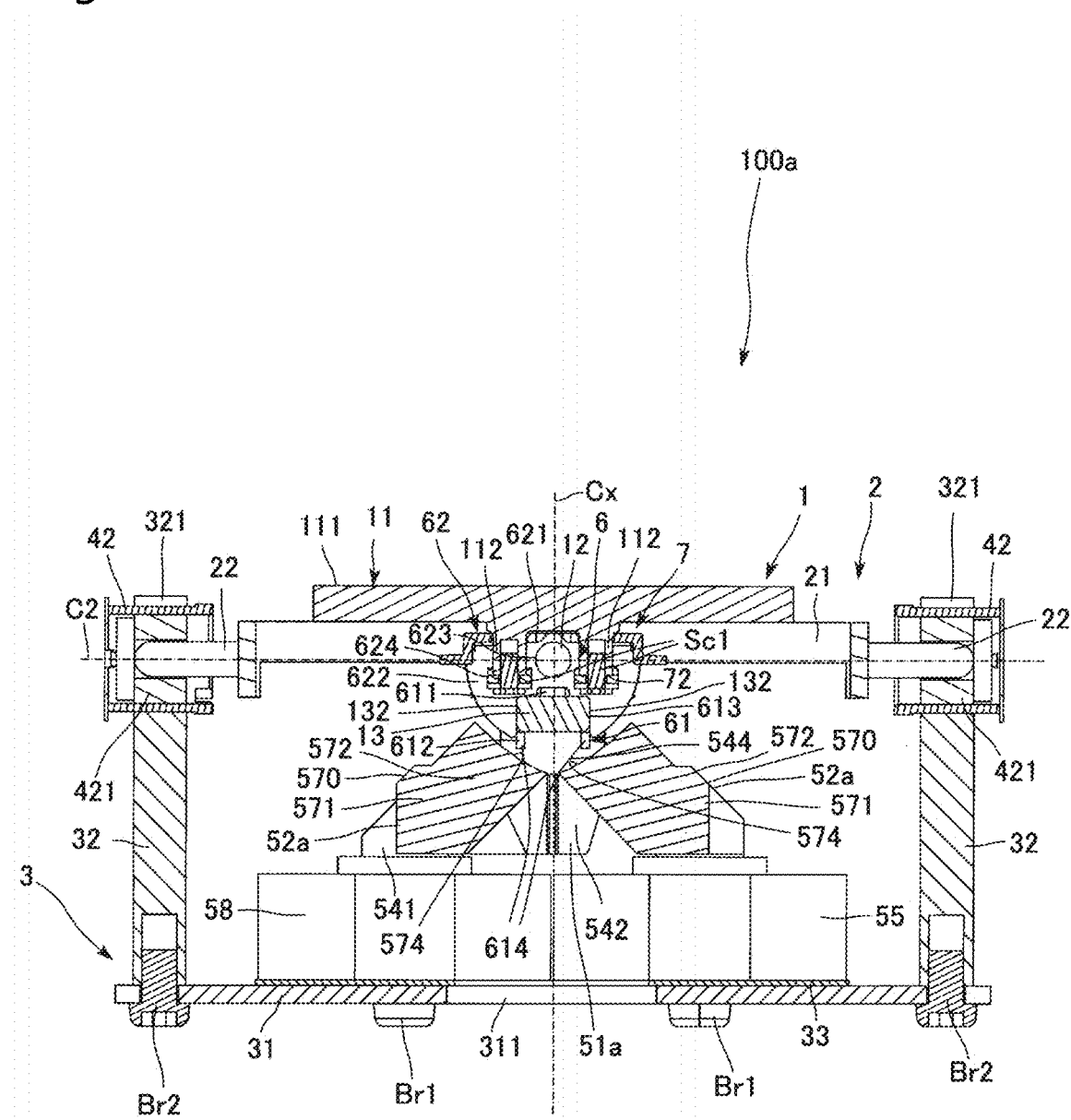
[Fig. 15]

OPTICAL ELEMENT AND OPTICAL SCANNING DEVICE

CROSS REFERENCE TO RELATED APPLICATION

The present invention claims priority under 35 U.S.C. § 119 to Japanese Application No. 2019-174628 filed on Sep. 25, 2019 the entire contents of which are hereby incorporated herein by reference.

1. FIELD OF THE INVENTION

The present disclosure relates to an optical element and an optical scanning device.

2. BACKGROUND

Conventionally, a movable plate is supported by a torsionally deformable connecting portion in an optical scanner. The drive unit rotates the movable plate about a predetermined axis along the connecting portion, and a light reflecting portion provided on the movable plate is irradiated with light. As a result, the light reflected by the light reflecting portion is scanned in one predetermined direction.

The drive unit has a permanent magnet fixed to a lower surface of the movable plate with an adhesive, and a coil. The drive unit rotates the movable plate about the predetermined axis by attracting the permanent magnet with a magnetic field generated by causing a current to flow through the coil.

In the case of the above-described optical scanner, there is a case where a direction in which the permanent magnet comes into contact with the movable plate and a rotating direction of the movable plate rotates become opposite when the movable plate rotates about the predetermined axis. The moment acting on the permanent magnet by the rotation of the movable plate, in other words, the centrifugal force is likely to be larger than an adhesive force of the adhesive, so that there is a possibility that the adhesion of the permanent magnet becomes incomplete to make the operation of the movable plate unstable.

SUMMARY

An optical element according to an example embodiment of the present disclosure includes a plate portion including a reflecting surface on an upper surface in a direction of a vertically extending central axis; a shaft that extends in a direction of a first axis intersecting with the central axis and is fixed to a lower surface of the plate portion; a magnet below the shaft in the direction of the central axis; and a holder below the plate portion to hold the magnet. The holder includes a magnet accommodating portion in which the magnet is accommodated. The magnet accommodating portion includes a magnet pressing portion that covers at least a portion of a lower surface of the magnet.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a perspective view of an optical scanning device that is an example of an actuator according to an example embodiment of the present disclosure.

FIG. 2 is an exploded perspective view of the optical scanning device illustrated in FIG. 1.

FIG. 3 is a cross-sectional view taken along a plane including a first axis of the optical scanning device illustrated in FIG. 1.

FIG. 4 is a cross-sectional view of the optical scanning device taken along a plane orthogonal to FIG. 3.

FIG. 5 is a perspective view of a fixed portion.

FIG. 6 is a plan view of the fixed portion.

FIG. 7 is a perspective view of a stator core.

FIG. 8 is a perspective view of the stator core as viewed from a different angle from FIG. 7.

FIG. 9 is a perspective view of a swing portion as viewed from below.

FIG. 10 is a perspective view illustrating a step of attaching a second holder member 62 of a holder to a shaft.

FIG. 11 is a perspective view illustrating a step of fixing a plate to the shaft to which the second holder member has been attached.

FIG. 12 is a perspective view illustrating a step of fixing the shaft to a plate portion.

FIG. 13 is a perspective view illustrating a step of attaching a first holder member to the second holder member.

FIG. 14 is a perspective view illustrating a step of attaching a magnet to the first holder member.

FIG. 15 is a cross-sectional view of another example of an optical scanning device according to an example embodiment of the present disclosure.

DETAILED DESCRIPTION

Example embodiments of the present disclosure will be described in detail with reference to the drawings. In the present specification, a central axis Cx, a first axis C1, and a second axis C2 are defined as follows. In an optical scanning device 100 illustrated in FIG. 1, the central axis Cx extends vertically. In addition, the first axis C1 and the second axis C2 are orthogonal to each other. The central axis Cx intersects with each of the first axis C1 and the second axis C2 at intersections with the first axis C1 and the second axis C2. The second axis C2 is always orthogonal to the central axis Cx. In addition, the first axis C1 is orthogonal to the central axis Cx when an optical element 1 is stopped. In addition, the top and bottom are defined along the central axis Cx with the optical scanning device 100 illustrated in FIG. 1 as a reference. The above-described designations of directions are used for the purpose of description, and do not limit positional relationships and directions in a use state of the optical scanning device 100.

FIG. 1 is a perspective view of an optical scanning device 100 according to the present disclosure. FIG. 2 is an exploded perspective view of the optical scanning device 100 illustrated in FIG. 1. FIG. 3 is a cross-sectional view taken along a plane including the first axis C1 of the optical scanning device 100 illustrated in FIG. 1. FIG. 4 is a cross-sectional view of the optical scanning device 100 taken along a plane orthogonal to FIG. 3. The optical scanning device 100 is one of use examples of the actuator. The actuator causes the optical element 1 to swing about the first axis C1 and the second axis C2 which are orthogonal to each other.

The optical scanning device 100 reflects the light from the light source (not illustrated) on a reflecting surface 111, which will be described below, provided on the optical element 1. The reflecting surface 111 reflects the light while swinging, thereby moving the reflected light and irradiating a wide range with the light, that is, scanning the light. As illustrated in FIGS. 1 to 4, the optical scanning device 100 includes the optical element 1, a frame portion 2, a fixed portion 3, first bearings 41, and second bearings 42. That is, the optical scanning device 100 has the optical element 1, the frame portion 2, and the fixed portion 3. Next, details of each portion of the optical scanning device 100 will be described.

FIG. 5 is a perspective view of the fixed portion 3. FIG. 6 is a plan view of the fixed portion 3. The fixed portion 3 is fixed to a mounting object such as an automobile and an unmanned aerial vehicle. As illustrated in FIGS. 1 to 6, the fixed portion 3 includes a pedestal portion 31, support portions 32, an insulator 33, first stator cores 51, second stator cores 52, first coils 55, and second coils 58.

As illustrated in FIGS. 5 and 6, the pedestal portion 31 has a rectangular plate shape. As illustrated in FIGS. 2 to 4, and the like, the longitudinal direction of the pedestal portion 31 is a direction along the second axis C2. The pedestal portion 31 may be made of, for example, a magnetic material such as iron. The pedestal portion 31 has a pedestal hole 311 penetrating along the central axis Cx at the center. The pedestal hole 311 is a hole through which lead wires of the first coil 55 and the second coil 58 pass. Two support portions 32 are arranged on an upper surface of the pedestal portion 31 in the direction of the central axis Cx. The support portions 32 are arranged apart from each other in the direction of the second axis C2, and extend upward from the upper surface of the pedestal portion 31 along the central axis Cx.

A concave second bearing holding portion 321, which penetrates in the direction of the second axis C2 and is open upward, is formed at an upper end of the support portion 32. The second bearing holding portion 321 holds the second bearing 42. The second bearing holding portion 321 supports the frame portion 2 swingably via the second bearing 42. That is, the fixed portion 3 supports the frame portion 2 to be swingable about the second axis C2 orthogonal to the first axis C1. As illustrated in FIG. 6, the support portion 32 is fixed to the pedestal portion 31 with a screw Br2. The fixing of the support portion 32 to the pedestal portion 31 is not limited to the screw, and a method of being capable of firmly fixing the support portion 32 to the pedestal portion 31, such as welding and adhesion, can be widely adopted.

Two first stator cores 51 and two second stator cores 52 are arranged on the upper surface of the pedestal portion 31 in the direction of the central axis Cx. Note that the first stator core 51 and the second stator core 52 have the same configuration and shape.

Details of the first stator core 51 and the second stator core 52 will be described with reference to the drawings. The first stator core 51 and the second stator core 52 have the same configuration and shape. Therefore, the first stator core 51 will be described as a representative of the first stator core 51 and the second stator core 52 in this chapter. FIG. 7 is a perspective view of the first stator core 51. FIG. 8 is a perspective view of the first stator core 51 as viewed from a different angle from FIG. 7.

The first stator core 51 is a molded body formed by sintering powder of a magnetic material such as iron powder as the same member, but is not limited thereto. For example, the first stator core 51 may be a stacked body in which magnetic plates are stacked. As illustrated in FIGS. 7 and 8, the first stator core 51 has a tooth portion 53 and an extending portion 54.

The tooth portion 53 has a columnar shape. Here, a direction in which the tooth portion 53 extends is the direction along the central axis Cx. The tooth portion 53 illustrated in FIGS. 7 and 8 has a rectangular parallelepiped shape, but is not limited thereto. For example, the tooth portion 53 may be a cylindrical column or a column having a polygonal cross-sectional shape other than a square such as a hexagon and an octagon.

The extending portion 54 has a first arm portion 541 and a second arm portion 542. The first arm portion 541 of the extending portion 54 extends from the upper end of the tooth portion 53 in a direction orthogonal to the tooth portion 53. The second arm portion 542 extends from a free end of the first arm portion 541 along the central axis Cx and in a direction inclined with respect to the central axis Cx. The free end of the second arm portion 542 has an end surface 543. The end surface 543 is a surface that intersects with, specifically, a surface that is orthogonal to a direction in which the second arm portion 542 extends.

As viewed in the direction of the central axis Cx, the first arm portion 541 has an outer side surface 540 on a side opposite to the direction in which the second arm portion 542 extends. The outer side surface 540 is inclined in the same direction as the direction in which the second arm portion 542 extends.

The first stator core 51 has the configuration described above. In addition, the tooth portion 53 and the extending portion 54 of the first stator core 51 correspond to a tooth portion 56 and an extending portion 57 of the second stator core 52, respectively. In addition, the first arm portion 541, the second arm portion 542, and the end surface 543 of the extending portion 54 of the first stator core 51 correspond to the first arm portion 571, the second arm portion 572, and the end surface 573 of the extending portion 57 of the second stator core 52, respectively.

As described above, the first stator core 51 and the second stator core 52 of the fixed portion 3 are arranged on the upper surface of the pedestal portion 31. The tooth portion 53 of the first stator core 51 is fixed to the pedestal portion 31 with a screw Br1, and the tooth portion 56 of the second stator core 52 is fixed to the pedestal portion 31 with a screw Br1 (see FIGS. 3 and 4). Note that fixing of the tooth portion 53 and the tooth portion 56 is not limited to the screw, and welding, adhesion, or the like may be adopted.

In the fixed portion 3 illustrated in FIG. 6, a region corresponding to the first quadrant when the first axis C1 is the x-axis and the second axis C2 is the y-axis will be described as a first region Ar1. Similarly, a region corresponding to the second quadrant, a region corresponding to the third quadrant, and a region corresponding to the fourth quadrant will be described as a second region Ar2, a third region Ar3, and a fourth region Ar4, respectively.

As illustrated in FIGS. 5 and 6, the tooth portions 53 of the two first stator cores 51 are arranged at opposite positions with the central axis Cx interposed therebetween as viewed in the direction of the central axis Cx. In addition, the tooth portions 56 of the two second stator cores 52 are arranged at opposite positions with the central axis Cx interposed therebetween. The first stator core 51 and the second stator core 52 are arranged alternately in the circumferential direction.

The end surfaces 543 of the two first stator cores 51 oppose each other in the direction of the first axis C1. In addition, each of the end surfaces 543 faces the magnet 13 arranged above (see FIG. 3 and the like). With the central axis Cx as the center, the centers of the respective tooth portions 53 in the circumferential direction are arranged at positions separated by 45° in the same direction with respect to the centers of the end surfaces 543 in the circumferential direction, here, in the counterclockwise direction in FIG. 6. As described above, the tooth portion 53 has the rectangular parallelepiped shape, and each side surface thereof is arranged parallel to the first axis C1 and the second axis C2. In FIG. 6, the tooth portions 53 of the two first stator cores 51 are arranged in the first region Ar1 and the third region Ar3, respectively.

The first arm portion 541 of the extending portion 54 of each of the first stator cores 51 extends from the upper end of the tooth portion 53 in the clockwise direction in the circumferential direction about the central axis Cx. The first arm portion 541 is arranged parallel to the pedestal portion 31 and is orthogonal to the first axis C1 as viewed in the direction of the central axis Cx. The first arm portion 541 is not necessarily parallel to the pedestal portion 31. In addition, the first arm portion 541 may intersect with the first axis C1 at an angle other than the perpendicular as viewed in the central axis direction.

The second arm portion 542 extends upward in the direction of the central axis Cx from the free end of the first arm portion 541. The second arm portion 542 approaches the central axis Cx as proceeding upward in the direction of the central axis Cx. That is, the second arm portion 542 is inclined upward as proceeding toward the central axis Cx along the first axis C1. As a result, the second arm portion 542 extends in a direction away from the pedestal portion 31 while approaching the central axis Cx. A surface of the second arm portion 542 close to the free end is the end surface 543.

In addition, the end surfaces 573 of the two second stator cores 52 oppose each other in the direction of the second axis C2. In addition, each of the end surfaces 573 faces the magnet 13 arranged above (see FIG. 4 and the like). Then, with the central axis Cx as the center, the centers of the respective tooth portions 56 in the circumferential direction are arranged at positions separated by 45° in the same direction with respect to the centers of the end surfaces 573 in the circumferential direction, here, in the counterclockwise direction in FIG. 6. As described above, the tooth portion 56 has the rectangular parallelepiped shape, and each side surface thereof is arranged parallel to the second axis C2 and the first axis C1. In FIG. 6, the tooth portions 56 of the two second stator cores 52 are arranged in the second region Ar2 and the fourth region Ar4, respectively.

The first arm portion 571 of the extending portion 57 of each second stator core 52 extends in the clockwise direction from the upper end of the tooth portion 56 in the circumferential direction about the central axis Cx. The first arm portion 571 is arranged parallel to the pedestal portion 31 and is orthogonal to the second axis C2 as viewed in the direction of the central axis Cx. The first arm portion 571 is not necessarily parallel to the pedestal portion 31. In addition, the first arm portion 571 may intersect with the second axis C2 at an angle other than the perpendicular as viewed in the central axis direction.

The second arm portion 572 extends upward in the direction of the central axis Cx from the free end of the first arm portion 571 along the second axis C2. In addition, the second arm portion 572 approaches the central axis Cx as proceeding upward in the direction of the central axis Cx. That is, the second arm portion 572 is inclined upward as proceeding toward the central axis Cx along the second axis C2. As a result, the second arm portion 572 extends in a direction away from the pedestal portion 31 while approaching the central axis Cx. A surface of the second arm portion 572 close to the free end is the end surface 573.

The first coil 55 and the second coil 58 are formed by winding a lead wire around the tooth portion 53 and the tooth portion 56 with the insulator 33 interposed therebetween. The insulator 33 is made of an insulating material. The insulator 33 covers an outer side surface of each of the tooth portion 53 and the tooth portion 56. Then, the first coil 55 and the second coil 58 are formed by winding lead wires around the respective outer side surfaces of the tooth portion 53 and the tooth portion 56 covered by the insulator 33.

The insulator 33 insulates the conductive lead wire from each of the conductive tooth portions 53 and 56. In the fixed portion 3, the pedestal portion 31 is also conductive. Therefore, the insulator 33 is formed so as to be capable of being insulated from the pedestal portion 31 as well. In the insulator 33, a plate-shaped member 331 arranged on an upper surface of the pedestal portion 31, and a tubular members 332, which protrudes from the plate-shaped member 331 in the direction along the central axis Cx and accommodates each of the tooth portion 53 and the tooth portion 56, are formed using the same member. In the insulator 33, the plate-shaped member 331 and the tubular member 332 may be formed separately.

The lead wire wound around each of the tooth portion 53 and the tooth portion 56 is wired below the pedestal portion 31 through the pedestal hole 311 of the pedestal portion 31. The lead wire is connected to a control circuit such as a driver circuit (not illustrated). That is, an electromagnet is formed by forming the first coil 55 and the second coil 58 in the tooth portion 53 of the first stator core 51 and the tooth portion 56 of the second stator core 52, respectively. When a current is applied to each of the first coil 55 and the second coil 58, the end surface 543 and the end surface 573 serve as magnetic pole surfaces, respectively.

As the tooth portion 53 and the tooth portion 56 are arranged at positions shifted by 45° in the circumferential direction with respect to the end surface 543 and the end surface 573, respectively, the first coil 55 and the second coil 58 can be arranged in a narrow region. As a result, each space factor of the first coil 55 and the second coil 58 can be increased. As a result, the optical scanning device 100 can be downsized, and a swing torque of the optical element 1 can be increased or power consumption can be reduced.

Details of the optical element 1 will be described with reference to the drawings. FIG. 9 is a perspective view of the optical element 1 as viewed from below. The optical element 1 has a plate portion 11, a shaft 12, the magnet 13, a holder 6, and two plates 7.

The plate portion 11 has a plate shape whose square corner is formed into a curved surface as viewed in the direction of the central axis Cx. The plate portion 11 has the reflecting surface 111 and a protruding portion 112. The reflecting surface 111 is formed on an upper surface of the plate portion 11 in the direction of the central axis Cx. That is, the plate portion 11 has the reflecting surface 111 on the upper surface in the direction of the vertically extending central axis Cx.

The reflecting surface 111 reflects light emitted from a light source (not illustrated). The plate portion 11 is made of metal such as stainless steel and an aluminum alloy. The reflecting surface 111 is formed by mirror-finishing the upper surface of the plate portion 11 in the direction of the central axis Cx. Note that the reflecting surface 111 is not limited to the one formed by mirror finishing. For example, at least a part of the upper surface of the plate portion 11 may be formed by plating that reflects light. As the reflecting surface 111, configurations capable of reflecting light from the light source can be widely adopted.

The protruding portion 112 has a tubular shape that extends downward from a central portion of a lower surface of the plate portion 11 in the direction of the central axis Cx. The protruding portions 112 are arranged side by side in the direction of the second axis C2 with the shaft 12 interposed therebetween. The protruding portion 112 has a screw hole that is open downward. Plate portion fixing portions 72 of plates 7 to be described below are fixed to the protruding portions 112.

The shaft 12 extends in the direction of the first axis C1. Both ends of the shaft 12 in the direction of the first axis C1 are swingably supported by the first bearing 41. The shaft 12 is fixed to the lower surface of the plate portion 11 via the plate 7. Details of the plate 7 will be described below. That is, the shaft 12 extends in the direction of the first axis C1 intersecting with the central axis Cx and is fixed to the lower surface of the plate portion 11.

As illustrated in FIGS. 3 to 6 and the like, the magnet 13 has a plate shape with a square cross section. The magnet 13 has two first planes 131 and two second planes 132 on side surfaces thereof. The two first planes 131 are two parallel surfaces among the side surfaces of the rectangular parallelepiped, and the two second planes 132 are arranged side by side in parallel in a direction orthogonal to a direction in which the first planes 131 are arrayed. The magnet 13 is fixed below the shaft 12 via the holder 6. That is, the magnet 13 is arranged below the shaft 12 in the direction of the central axis Cx.

When the magnet 13 is fixed to the shaft 12, the first planes 131 are arranged side by side in the direction of the first axis C1, and the second planes 132 are arranged side by side in the direction of the second axis C2. More specifically, each of the first planes 131 oppose each of the end surfaces 543 in the direction along the first axis C1 (see FIG. 3). In addition, each of the second planes 132 opposes each of the end surfaces 573 in the direction along the second axis C2 (see FIG. 4).

The magnet 13 is the rectangular parallelepiped having the square cross section, but may have a polygonal columnar shape whose cross section is octagonal or the like as long as the shape has the first plane and the second plane. In addition, the magnet 13 may have a shape that does not have the first plane and the second plane, for example, a columnar shape or an elliptical columnar shape.

Details of the holder 6 and the plate 7 and a procedure for assembling the optical element 1 will be described with reference to the drawings of manufacturing steps of the optical element 1. FIG. 10 is a perspective view illustrating a step of attaching a second holder member 62 of the holder 6 to the shaft 12. FIG. 11 is a perspective view illustrating a step of fixing the plate 7 to the shaft 12 to which the second holder member 62 has been attached. FIG. 12 is a perspective view illustrating a step of fixing the shaft 12 to the plate portion 11. FIG. 13 is a perspective view illustrating a step of attaching a first holder member 61 to the second holder member 62. FIG. 14 is a perspective view illustrating a step of attaching the magnet 13 to the first holder member 61. The optical element 1 assembled through all the steps is the optical element 1 illustrated in FIG. 9.

The holder 6 is arranged on the lower surface of the plate portion 11 in the direction of the central axis Cx. The holder 6 holds the magnet 13 and is fixed to the shaft 12. That is, the holder 6 is arranged below the plate portion 11 and holds the magnet 13. The holder 6 is made of, for example, a magnetic material such as iron. That is, the holder 6 is made of a magnetic material. Since the holder 6 is made of the magnetic material in this manner, the holder 6 also serves as a yoke. As a result, it is possible to enhance the utilization efficiency of magnetism of the magnet 13. Thus, it is possible to increase the output or save power. When the output is increased, the swing angle of the optical element 1 can be also increased.

As illustrated in FIGS. 9 and 13 and the like, the holder 6 has the first holder member 61 and the second holder member 62. The second holder member 62 is fixed to the shaft 12. In addition, the first holder member 61 is fixed to the second holder member 62. That is, the second holder member 62 is fixed to the shaft 12, and the first holder member 61 is fixed. As the second holder member 62, a configuration manufactured by bending a metal plate may be adopted, but the second holder member 62 is not limited thereto. The second holder member 62 has a second bottom plate portion 621 and a pair of second side plate portions 622.

As illustrated in FIG. 9, the second bottom plate portion 621 extends along the lower surface of the plate portion 11 in the direction of the central axis Cx. The second bottom plate portion 621 is a long member, and the longitudinal direction thereof is the direction of the second axis C2. The pair of second side plate portions 622 extend downward in the direction of the central axis Cx from both end edges of the second bottom plate portion 621 in the direction of the first axis C1. The two second side plate portions 622 have the same shape and are arranged side by side in parallel to the direction of the first axis C1.

The second bottom plate portion 621 has bottom plate holes 625 that penetrate in the thickness direction. Two bottom plate holes 625 are formed side by side in the longitudinal direction. The bottom plate hole 625 has a size capable of accommodating the protruding portion 112 of the plate portion 11.

Each of the pair of second side plate portions 622 has a second penetrating portion 623. The second penetrating portion 623 penetrates through the second side plate portion 622 in the thickness direction. That is, each of the pair of second side plate portions 622 has the second penetrating portion 623 that penetrates in the thickness direction. The second penetrating portions 623 provided respectively in the pair of second side plate portions 622 overlap in the direction of the first axis C1.

The second holder member 62 further has an accommodation hole 624. That is, the holder 6 further has an accommodation hole 624 penetrating in the direction along the shaft 12. As viewed in the direction of the central axis Cx, the two accommodation holes 624 of each of the second side plate portions 622 are arranged side by side in the direction of the second axis C2 with the shaft 12 interposed therebetween. Then, each two accommodation holes 624 of the opposing second side plate portions 622 overlap in the direction of the first axis C1. Holder recesses 626 that are open to each end side are formed at lower ends of the respective second side plate portions 622 in the direction of the central axis Cx (see FIG. 9, and the like). The holder recesses 626 formed respectively in the two second side plate portions 622 also overlap in the direction of the first axis C1. The holder recess 626 accommodates and fixes the first holder member 61 as will be described below in detail.

As illustrated in FIG. 9, the shaft 12 extending in the direction of the first axis C1 penetrates through the second penetrating portions 623 formed in each of the two second side plate portions 622 and is fixed. That is, the shaft 12 penetrates through both of the second penetrating portions 623 and is fixed to the second holder member 62. In addition, the plate portion fixing portions 72, which will be described below, of the plates penetrate through the two accommodation holes 624 in the direction of the first axis C1. At this time, a plate penetrating portion 721, which will be described below, formed in the plate portion fixing portion 72 overlaps with the screw hole formed in the protruding portion 112 in the direction of the central axis Cx. The plate portion fixing portion 72 is fixed to the protruding portion 112 with a screw Sc1. Details of fixing of the plate 7, that is, the plate portion fixing portion 72 and the plate portion 11 will be described below.

As illustrated in FIG. 9, the first holder member 61 is fixed to a lower end of the second holder member 62 in the direction of the central axis Cx. The first holder member 61 has a first bottom plate portion 611 and a pair of first side plate portions 612. The first bottom plate portion 611 expands along the lower surface of the plate portion 11. The first bottom plate portion 611 is a long member, and the longitudinal direction thereof is the direction of the first axis C1. The pair of first side plate portions 612 extend downward in the direction of the central axis Cx from both end edges of the first bottom plate portion 611 in the direction of the second axis C2. The two first side plate portions 612 have the same shape and are arranged side by side in parallel to the direction of the second axis C2.

Each of the two first side plate portions 612 has a first penetrating portion 613. The first penetrating portions 613 penetrate the respective first side plate portions 612 in the thickness direction. That is, each of the pair of first side plate portions 612 has the first penetrating portion 613 that penetrates in the thickness direction. The first penetrating portions 613 overlap in the direction of the second axis C2. That is, the first penetrating portions 613 provided respectively in the first side plate portions 612 overlap in the direction intersecting the first axis C1. The magnet 13 is partially accommodated inside the pair of first penetrating portions 613. That is, the pair of first penetrating portions 613 form a magnet accommodating portion 63.

That is, each of the first penetrating portions 613 forms a magnet accommodating portion 63. In addition, the holder 6 has the magnet accommodating portion 63 in which the magnet 13 is accommodated. In addition, the magnet accommodating portion 63 extends in a direction intersecting with the first axis direction along the lower surface of the plate portion 11 in the direction of the central axis Cx. As a result, the magnet 13 can be arranged by inserting the magnet 13 into the magnet accommodating portion 63 from the direction intersecting with the direction of the first axis C1 in which the shaft 12 extends. As a result, it becomes easy to attach the magnet 13 to the holder 6.

A lower portion of the first side plate portion 612 below the first penetrating portion 613 in the direction of the central axis Cx is closed. In other words, the first penetrating portion 613 is a through-hole whose periphery is closed. Then, the lower portion of the first side plate portion 612 below the first penetrating portion 613 is a magnet pressing portion 614 in the direction of the central axis Cx. That is, the magnet accommodating portion 63 has the magnet pressing portion 614 that covers at least a part of the lower surface of the accommodated magnet 13.

The lower surface of the magnet 13 in the direction of the central axis Cx is covered by the magnet pressing portion 614. Note that the magnet pressing portion 614 may be in contact or may be in non-contact with the lower surface of the magnet 13 in the direction of the central axis Cx. Since the magnet pressing portion 614 covers the lower surface of the magnet 13 in the direction of the central axis Cx, the magnet 13 is unlikely to drop off with the moment generated when the optical element 1 swings about the first axis C1 and the second axis C2. As a result, the optical element 1 can be stably swung. It suffices that the magnet pressing portion 614 is in contact with a lower surface of the magnet 13, and a part thereof may be separated. That is, the first penetrating portion 613 may have a notched shape whose lower portion is open.

The magnet 13 accommodated in the magnet accommodating portion 63 is fixed to the first side plate portion 612 by adhesion, for example. That is, the first holder member 61 holds the magnet 13. Note that the magnet 13 may be fixed to the first bottom plate portion 611 without being limited to the first side plate portion 612. In addition, a fixing method is not limited to the adhesion. The magnet 13 is fixed to the shaft 12 via the holder 6. The holder 6 may be omitted if the magnet 13 can be fixed to the shaft 12.

As described above, the holder 6 is formed by combining the first holder member 61 and the second holder member 62. Therefore, each of both the first holder member 61 and the second holder member 62 can be formed by bending a metal plate. Therefore, it is easy to manufacture the holder 6.

The two plates 7 have the same shape. The plate 7 is manufactured by bending a metal plate. The plate 7 has a thickness smaller than a thickness of the plate portion 11. The plate 7 fixes the plate portion 11 and the shaft 12. That is, the optical element 1 further includes the plate 7 that fixes the plate portion 11 and the shaft 12. The plate 7 has a shaft fixing portion 71, the plate portion fixing portion 72, and a connecting portion 73. That is, the plate 7 has the shaft fixing portion 71 and the plate portion fixing portion 72.

The shaft fixing portion 71 is a plate that expands along the lower surface of the plate portion 11 in the direction of the central axis Cx. The shaft fixing portion 71 is a long member, and the longitudinal direction thereof is the direction along the first axis C1. An end on one side in the longitudinal direction of the shaft fixing portion 71 has an overhanging portion 711 overhanging along the plate portion 11 in the direction of the second axis C2. The shaft 12 is fixed to a lower surface of the shaft fixing portion 71 in the direction of the central axis Cx. That is, the shaft 12 is fixed to the shaft fixing portion 71. A method of fixing the shaft 12 to the shaft fixing portion 71 can be, for example, welding, but is not limited thereto. The shaft fixing portion 71 is arranged between the lower surface of the plate portion 11 and the shaft 12.

The plate portion fixing portion 72 is a plate that extends along the lower surface of the plate portion 11 in the direction of the central axis Cx. The plate portion fixing portion 72 has a long shape, and the longitudinal direction thereof extends in the direction of the first axis C1. The plate portion fixing portion 72 is located below the shaft fixing portion 71 in the direction of the central axis Cx. In addition, the shaft fixing portion 71 and the plate portion fixing portion 72 are arranged to be shifted in the direction of the first axis C1 and shifted in the direction of the second axis C2 as viewed in the direction of the central axis Cx. That is, the shaft fixing portion 71 overlaps with the shaft 12 as viewed from the direction of the central axis Cx. In addition, the plate portion fixing portion 72 does not overlap with the shaft 12 as viewed from the direction of the central axis Cx. The plate portion fixing portion 72 has the plate penetrating portion 721 penetrating in the thickness direction. The connecting portion 73 connects the overhanging portion 711 of the shaft fixing portion 71 and the plate portion fixing portion 72. The connecting portion 73 extends along the direction of the central axis Cx.

As viewed from the direction of the central axis Cx, the plate portion fixing portion 72 of the plate 7 is accommodated inside the two accommodation holes 624. The two accommodation holes 624 in which the plate portion fixing portion 72 is accommodated are arranged on the same side when being divided into right and left with the shaft 12 as the reference as viewed from the direction of the central axis Cx. At this time, the shaft fixing portions 71 of the respective plates 7 extend in the opposite directions along the direction of the first axis C1 as viewed from the second holder member 62. Then, the shaft fixing portion 71 is fixed to the shaft 12. That is, the two plates 7 are arranged at positions point-symmetric with each other with respect to the central axis Cx as viewed in the direction of the central axis Cx.

The plate penetrating portion 721 of the plate portion fixing portion 72 and the protruding portion 112 of the plate portion 11 are arranged side by side concentrically as viewed from the direction of the central axis Cx. Then, the screw Sc1 is inserted into the plate penetrating portion 721 from the lower side in the direction of the central axis Cx, and screwed into the protruding portion 112 to fix the plate 7 and the plate portion 11. As a result, the holder 6 and the plate portion 11 are also fixed. That is, the plate portion fixing portion 72 is connected to the shaft fixing portion 71 and fixed to the plate portion 11. Then, the plate portion fixing portion 72 is fixed to the plate portion 11 in the state of being accommodated in the accommodation hole 624.

Since the plate portion 11 and the shaft 12 are fixed using the plate 7, the plate portion 11 and the shaft 12 can be firmly fixed. In addition, the plate 7 can stably hold the holder 6 as the plate 7 is accommodated in the accommodation hole 724 of the holder 6. As a result, the magnet 13 held by the holder 6 is stably held with respect to the plate portion 11 and the shaft 12. The plate 7 may be omitted if a configuration capable of firmly fixing the shaft 12 and the plate portion 11 is provided.

The manufacturing steps of the optical element 1 will be described. As illustrated in FIG. 10, the shaft 12 is inserted into the second penetrating portion 623 formed on the second side plate portion 622 of the second holder member 62. Then, the second holder member 62 is moved along the shaft 12. The second holder member 62 is fixed to the shaft 12 at the central portion in the longitudinal direction of the shaft 12 (see FIG. 11). At this time, the shaft 12 may be fixed to the second side plate portion 622 of the second holder member 62 or may be fixed to the second bottom plate portion 621. Alternatively, the shaft 12 may be fixed to both the second bottom plate portion 621 and the second side plate portion 622.

The fixing of the shaft 12 and the second holder member 62 can include, but is not limited to, welding. For example, a fixing method such as adhesion and press fitting may be adopted. A method of firmly fixing the shaft 12 and the second holder member 62 can be widely adopted.

As illustrated in FIG. 11, the plate portion fixing portion 72 of each of the plates 7 is inserted into each of the accommodation holes 624, which are arranged so as to overlap in the direction of the first axis C1, from both sides in the direction of the first axis C1 of the second holder member 62 fixed to the shaft 12. At this time, the shaft fixing portion 71 of each of the plates 7 is arranged above the shaft 12 in the direction of the central axis Cx. Then, the shaft fixing portion 71 is fixed to the shaft 12 in a state where the plate penetrating portion 721 of the plate portion fixing portion 72 overlaps with the bottom plate hole 625 in the direction of the central axis Cx (see FIG. 12).

In this state, the second holder member 62 is fixed to the shaft 12. In addition, the plate portion fixing portions 72 of the two plates 7 are accommodated in the accommodation holes 624 of the second holder member 62, and the shaft fixing portion 71 is arranged above the shaft 12 in the direction of the central axis Cx. Then, the shaft fixing portion 71 is fixed to the shaft 12.

As illustrated in FIG. 12, the plate portion fixing portion 72 of the plate 7 is attached to the second holder member 62 fixed to the shaft 12. The protruding portion 112 of the plate portion 11 is inserted into the two bottom plate holes 625 of the second bottom plate portion 621 of the second holder member 62. At this time, a lower end surface of the protruding portion 112 in the direction of the central axis Cx is in contact with the plate portion fixing portion 72 of the plate 7. Then, the screw hole formed in the protruding portion 112 and the plate penetrating portion 721 of the plate portion fixing portion 72 overlap in the direction of the central axis Cx. In this state, the screw Sc1 is inserted into the plate penetrating portion 721 and screwed into the screw hole of the protruding portion 112, whereby the plate portion fixing portion 72 of the plate 7 is fixed to the protruding portion 112 (see FIG. 13). That is, the plate 7 fixes the plate portion 11 and the shaft 12.

As illustrated in FIG. 14, the shaft 12 is fixed to the plate portion 11 via the plate 7. Then, the second holder member 62 is fixed to the shaft 12. The first holder member 61 is inserted and fixed to the holder recess 626 of the second side plate portion 622 of the second holder member 62. When the first holder member has been attached to the holder recess 626, the first penetrating portion 613 formed in the first side plate portion 612 is fitted between the two second side plate portions 622 of the second holder member 62 in the direction of the first axis C1. At this time, the first holder member 61 is fixed to the second holder member 62.

The first holder member 61 is fixed to the second holder member 62 by welding a contact portion between the first side plate portion 612 and the second side plate portion 622. However, a fixing method is not limited to welding. In addition, the disclosure is not limited to the fixing of the first side plate portion 612 and the second side plate portion 622. A method of firmly fixing the first holder member 61 and the second holder member 62 can be widely adopted. As illustrated above, the shaft 12 fixed to the lower surface of the plate portion 11 is fixed to the holder 6. In addition, the holder 6 is held by the plate portion 11 via the plate 7.

As illustrated in FIG. 14, the magnet 13 is inserted into the first penetrating portion 613 formed on the first side plate portion 612 of the first holder member 61 in the direction along the second axis C2 from a gap between the second plane 132 and the second side plate portions 622 of the second holder member 62. Then, the magnet 13 is fixed in the state of being accommodated inside the first penetrating portion 613 (see FIG. 9). The magnet 13 is fixed, for example, by adhesion. Note that the fixing of the magnet 13 is not limited to adhesion, but any fixing method that does not reduce a magnetic force of the magnet 13 is used. At this time, the first plane 131 of the magnet 13 faces the outer side in the direction of the first axis C1. In addition, the second plane 132 of the magnet 13 faces the outer side in the direction of the second axis C2.

As illustrated in FIGS. 1 and 2 and the like, the frame portion 2 has an annular portion 21 and the rotary protrusions 22. The annular portion 21 has a circular ring shape centered on the central axis Cx. The rotary protrusion 22 is a columnar shape that protrudes outward from the annular portion 21 in the direction of the second axis C2. The annular portion 21 has first bearing holding portions 211 at ends in the direction of the first axis C1. The first bearing holding portion 211 is a recess that is recessed upward in the direction of the central axis Cx. The first bearing 41 is held by the first bearing holding portion 211.

The rotary protrusion 22 is press-fitted and fixed in a through-hole provided in the annular portion 21. However, the disclosure is not limited thereto, and the annular portion 21 and the rotary protrusion 22 may be formed using the same member. Then, the rotary protrusion 22 is swingably supported by the second bearing holding portion 321 formed on the support portion 32 of the fixed portion 3 via the second bearing 42. The second bearing 42 has a sleeve 421 that holds the rotary protrusion 22 therein. The second bearing 42 is a slide bearing, but is not limited thereto, and a ball bearing or the like may be adopted.

The shaft 12 of the optical element 1 is swingably supported by the first bearing holding portion 211 of the annular portion 21 of the frame portion 2 via the first bearing 41. The first bearing 41 has a sleeve 411 that holds the shaft 12 therein. Note that the first bearing 41 is a slide bearing, but is not limited thereto, and a ball bearing or the like may be adopted.

As a result, the optical element 1 is supported by the frame portion 2 via the first bearing 41 so as to be swingable about the first axis C1. In addition, the frame portion 2 is swingably supported about the second axis C2 via the second bearing 42. Therefore, the optical element 1 is swingable about the first axis C1, and the optical element 1 is swingable about the second axis C2 together with the frame portion 2.

The optical scanning device 100 has the configuration described above. An operation of the optical scanning device 100 will be described hereinafter. The optical scanning device 100 supplies a current to the first coil 55 and the second coil 58 arranged in the fixed portion 3, and causes the optical element 1 to operate by magnetic forces generated in the first stator core 51 and the second stator core 52 due to the energization of the first coil 55 and the second coil 58, and the magnetic force of the magnet 13. That is, the fixed portion 3 forms a magnetic circuit with the magnet 13. The optical element 1 operates as follows.

For example, the magnetic field is generated inside the second stator core 52 by supplying the current to the second coil 58. The end surface 573 of the second stator core 52 is the magnetic pole surface. Note that the second stator core 52 has a shape that has a small change in cross-sectional area orthogonal to magnetic flux lines generated inside (see FIGS. 7 and 8). That is, as the free end of the extending portion 57 is cut by the amount of the connecting portion between the tooth portion 56 and the extending portion 57, the change in cross-sectional area orthogonal to the magnetic flux lines is suppressed. In this manner, a change in magnetic flux density is suppressed, and the magnetic force generated due to the energization of the second coil 58 is used efficiently. Note that the first stator core 51 having the same shape is also similar, and has the same effect.

As currents in opposite directions are supplied to the two second coils 58, one of the end surfaces 573 opposing each other in the direction along the second axis C2 serves as the N pole and the other serves as the S pole. Assuming that the lower surface of the magnet 13 in the direction of the central axis Cx is the magnetic pole surface and is the S pole, the magnet 13 is pulled toward the end surface 573 serving as the N pole, and repels the end surface 573 serving as the S pole. At this time, the shaft holding the magnet 13 is swingably supported by the frame portion 2 via the first bearing 41. That is, the frame portion 2 supports the shaft 12 to be swingable about the first axis C1. Therefore, the optical element 1 having the plate portion 11 to which the shaft 12 has been fixed is inclined with the first axis C1 as the center. Then, the optical element 1 swings about the first axis C1 as the currents flowing to the second coils 58 are controlled to switch between the N pole and the S pole of the end surfaces 573.

The holder 6 has a portion protruding downward in the direction of the central axis Cx with respect to the first axis C1. Therefore, as the optical element 1 swings about the first axis C1, the locus of a lower end of the holder 6 in the direction of the central axis Cx becomes an arc centered on the first axis C1. As illustrated in FIG. 4, the end surface 573 is inclined in a direction away from the central axis Cx as proceeding upward in the direction of the central axis Cx. Since the end surface 573 is formed in this manner, it is possible to approach the locus of the lower end of the holder 6. As a result, a distance between the end surface 573 and the magnet 13 can be shortened, and the magnetic force generated between the second stator core 52 and the magnet 13 can be increased.

As illustrated in FIG. 4, the second plane 132 of the magnet 13 opposes the end surface 573 in the direction of the second axis C2. This also enables the distance between the end surface 573 and the magnet 13 to be shortened.

When the optical element 1 swings about the first axis C1, the amplitude of the end in the direction of the second axis C2 orthogonal to the first axis C1 becomes the maximum. As illustrated in FIGS. 5 and 6 and the like, the tooth portion 56 is shifted from the end surface 573 by 45° in the circumferential direction about the central axis Cx. That is, the tooth portion 56 and the second coil 58 are shifted from the first axis C1 and the second axis C2. As a result, when the optical element 1 swings about the first axis C1, it is difficult for a portion having the maximum amplitude to interfere with the tooth portion 56 and the second coil 58. For this reason, it is possible to reduce each retraction amount of the tooth portion 56 and the second coil 58 in the direction of the central axis Cx to suppress the interference with the optical element 1 and to suppress the height of the fixed portion 3 in the direction of the central axis Cx. As a result, the height of the optical scanning device 100 can be kept low. That is, the optical scanning device 100 can be downsized.

The second arm portion 572 approaches the central axis Cx as upward in the direction of the central axis Cx in the direction of the second axis C2. With such a shape, the interference with the optical element 1 hardly occurs when the optical element 1 swings as compared to the configuration in which the second arm portion 572 extends in the direction orthogonal to the central axis Cx in the direction of the second axis C2. In addition, it is possible to form the second arm portion 572 thicker as compared to the case of extending along the central axis Cx. As a result, the second arm portion 572 is formed to be inclined so that the interference hardly occurs when the optical element 1 swings, and further, it is possible to increase the cross-sectional area orthogonal to the magnetic flux lines. Therefore, the magnetic flux can be effectively used, and a swing angle of the optical element 1 can be increased.

In addition, an outer side surface 570 of the first arm portion 571 is inclined so as to approach the central axis as proceeding upward in the direction of the central axis Cx. With such an inclination, the optical element 1 is less likely to interfere with the first arm portion 571 when the optical element 1 swings. Therefore, the swing angle of the optical element 1 can be increased. The inclination direction of the outer side surface 570 and the inclination direction of the second arm portion 572 are the same.

Similarly, the magnetic field is generated inside the first stator core 51 by supplying the current to the first coil 55. The end surface 543 of the first stator core 51 serves as the magnetic pole surface. As currents in opposite directions are supplied to the two first coils 55, one of the end surfaces 543 opposing each other in the direction along the first axis C1 serves as the N pole and the other serves as the S pole.

The lower surface of the magnet 13 in the direction of the central axis Cx is pulled toward the end surface 543 serving as the N pole, and repels the end surface 543 serving as the S pole. The two end surfaces 543 are arranged to oppose each other in the direction of the first axis C1 in which the shaft 12 extends. Therefore, the magnetic force generated between the magnet 13 and the end surface 543 does not cause the optical element 1 to swing about the shaft 12.

On the other hand, the rotary protrusion 22 of the frame portion 2 supporting the shaft 12 via the first bearing 41 is swingably supported by the support portion 32 via the second bearing 42. Therefore, the optical element 1 and the frame portion 2 are inclined with the second axis C2 as the center due to the magnetic force between the two end surfaces 543 and the magnet 13. In other words, the optical element 1 is inclined together with the frame portion 2 with the second axis C2 as the center. Then, the optical element 1 swings about the second axis C2 together with the frame portion 2 as the currents flowing to the first coils 55 are controlled to switch between the N pole and the S pole of the end surfaces 543.

The two end surfaces 543 and the two end surfaces 573 define a quadrangular pyramid space. The magnet 13 is swung inside the quadrangular pyramid space defined by the four end surfaces.

The holder 6 has a portion that protrudes downward in the direction of the central axis Cx with respect to the rotary protrusion 22. Therefore, as the optical element 1 swings about the second axis C2 together with the frame portion 2, the locus of a lower end of the holder 6 in the direction of the central axis Cx becomes an arc centered on the second axis C2. As illustrated in FIG. 3, the end surface 543 is inclined in a direction away from the central axis Cx as proceeding upward in the direction of the central axis Cx. Since the end surface 543 is formed in this manner, it is possible to approach the locus of the lower end of the holder 6. As a result, a distance between the end surface 543 and the magnet 13 can be shortened, and the magnetic force generated between the second stator core 52 and the magnet 13 can be increased.

As illustrated in FIG. 4, the first plane 131 of the magnet 13 opposes the end surface 543 in the direction of the first axis C1. This also enables the distance between the end surface 543 and the magnet 13 to be shortened.

When the optical element 1 swings about the second axis C2 together with the frame portion 2, the amplitude of the end in the direction of the first axis C1 orthogonal to the second axis C2 becomes the maximum. That is, the amplitude of the end of the first bearing 41 that rotatably supports the shaft 12 is maximized. As illustrated in FIGS. 5 and 6 and the like, the tooth portion 53 is shifted from the end surface 543 by 45° in the circumferential direction about the central axis Cx. That is, the tooth portion 53 and the first coil 55 are shifted from the first axis C1 and the second axis C2. When the optical element 1 and the frame portion 2 swing about the second axis C2, the first bearing 41 is less likely to interfere with the tooth portion 53 and the first coil 55. For this reason, it is possible to reduce each retraction amount of the tooth portion 53 and the first coil 55 in the direction of the central axis Cx to suppress the interference with the first bearing 41 and to suppress the height of the fixed portion 3 in the direction of the central axis Cx. As a result, the height of the optical scanning device 100 can be kept low. That is, the optical scanning device 100 can be downsized.

The second arm portion 542 approaches the central axis Cx as upward in the direction of the central axis Cx in the direction of the first axis C1. With such a shape, the interference with the optical element 1 hardly occurs when the optical element 1 swings as compared to the configuration in which the second arm portion 542 extends in the direction orthogonal to the central axis Cx in the direction of the first axis C1. In addition, it is possible to form the second arm portion 572 thicker as compared to the case of extending along the central axis Cx. As a result, the second arm portion 542 is formed to be inclined so that the interference hardly occurs when the optical element 1 swings, and further, it is possible to increase the cross-sectional area orthogonal to the magnetic flux lines. Therefore, the magnetic flux can be effectively used, and a swing angle of the optical element 1 can be increased.

In addition, an outer side surface 540 of the first arm portion 541 is inclined so as to approach the central axis Cx as proceeding upward in the direction of the central axis Cx. With such an inclination, the optical element 1 is less likely to interfere with the first arm portion 541 when the optical element 1 swings. Therefore, the swing angle of the optical element 1 can be increased. The inclination direction of the outer side surface 540 and the inclination direction of the second arm portion 542 are the same.

The current supplied to the first coil 55 and the second coil 58 is controlled by the control circuit (not illustrated) in the optical scanning device 100, so that the optical element 1 swings about the first axis C1 and the second axis C2. The optical scanning device can irradiate the reflecting surface 111 of the plate portion 11 of the optical element 1 with light from a light source (not illustrated) and scan the reflected light in the direction along the first axis C1 and the direction along the second axis C2.

FIG. 15 is a cross-sectional view of another example of an optical scanning device 100a according to the present disclosure. In the optical scanning device 100a illustrated in FIG. 15, a first stator core 51a and a second stator core 52a are different from the first stator core 51 and the second stator core 52 illustrated in FIG. 4 and the like. More specifically, the first stator core 51a has the same configuration as the first stator core 51 except that the end surface 543 is replaced with an end surface 544. In addition, the second stator core 52a has the same configuration as the first stator core 51 except that the end surface 573 is replaced with an end surface 574. The other portions of the optical scanning device 100a have the same configurations as those of the optical scanning device 100, and the substantially same portions will be denoted by the same reference signs, and detailed descriptions of the same portions will not be omitted.

As illustrated in FIG. 15, the end surface 574 of the second stator core 52a of the optical scanning device 100a has an inclination that is away from the central axis Cx as proceeding upward in the direction of the central axis Cx. Further, the end surface 544 has a curved shape whose angle with respect to a plane orthogonal to the central axis Cx increases as proceeding upward in the direction of the central axis Cx. The end surface 544 of the first stator core 51a also has the same configuration as the end surface 574. With such a configuration, the end surface 574 can be brought closer to the holder 6 when the optical element 1 swings about the first axis C1. Similarly, the end surface 544 can be brought closer to the holder 6 when the optical element 1 and the frame portion 2 swing about the second axis C2. As a result, the magnetic force between each of the first stator core 51a and the second stator core 52a and the magnet 13 can be used more effectively.

In the optical scanning devices 100 and 100a illustrated above, the optical element 1 is swung about the first axis C1, and the frame portion 2 is swung about the second axis C2 together with the optical element 1. As a result, the reflected light is scanned in the two-dimensional direction. However, the disclosure is not limited thereto. For example, the optical scanning device may be swung only about the first axis C1 to scan light in the one-dimensional direction.

Although the example embodiment of the present disclosure has been described, the present disclosure is not limited to this content. In addition, the example embodiment of the present disclosure can be modified in various ways without departing from a gist of the disclosure.

For example, the optical scanning device of the present disclosure can be used for a detection device that detects a distance to a surrounding object, a shape of an object, and the like by scanning and irradiating the surroundings with light and acquiring the reflected light. In addition to this, the optical scanning device can be also used as, for example, an actuator of a device which is used by being swung about two orthogonal axes or one axis.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical element comprising:
   a plate portion including a reflecting surface on an upper surface in a direction of a vertically extending central axis;
   a shaft that extends in a direction of a first axis intersecting with the central axis and is fixed to a lower surface of the plate portion;
   a magnet below the shaft in the direction of the central axis; and
   a holder below the plate portion to hold the magnet; wherein
   the holder includes a magnet accommodating portion in which the magnet is accommodated; and
   the magnet accommodating portion includes a magnet pressing portion that covers at least a portion of a lower surface of the accommodated magnet.

2. The optical element according to claim 1, wherein the magnet accommodating portion extends in a direction intersecting with the direction of the first axis along a lower surface of the plate portion in the direction of the central axis.

3. The optical element according to claim 1, wherein the holder includes:

a first holder to hold the magnet; and
   a second holder fixed to the shaft and to which the first holder is fixed.

4. The optical element according to claim 3, wherein the first holder includes:
   a first bottom plate portion expanding along the lower surface of the plate portion in the direction of the central axis; and
   a pair of first side plate portions extending downward in the direction of the central axis from both end edges of the first bottom plate portion in a direction perpendicular or substantially perpendicular to the direction of the first axis;
   the pair of first side plate portions respectively includes first penetrating portions penetrating in a thickness direction;
   the first penetrating portions provided in the respective first side plate portions overlap in a direction intersecting with the first axis; and
   each of the first penetrating portions defines the magnet accommodating portion.

5. The optical element according to claim 3, wherein the second holder includes:
   a second bottom plate portion expanding along the lower surface of the plate portion in the direction of the central axis; and
   a pair of second side plate portions extending downward in the direction of the central axis from both end edges of the second bottom plate portion in the direction of the first axis;
   the pair of second side plate portions are respectively provided with second penetrating portions penetrating in a thickness direction;
   the second penetrating portions respectively provided in the pair of second side plate portions overlap in the direction of the first axis; and
   the shaft penetrates both the second penetrating portions and is fixed to the second holder.

6. The optical element according to claim 1, further comprising:
   a plate that fixes the plate portion and the shaft; wherein
   the holder further includes an accommodation hole penetrating in a direction along the shaft;
   the plate includes:
   a shaft fixing portion to which the shaft is fixed; and
   a plate portion fixing portion connected to the shaft fixing portion and fixed to the plate portion; and
   the plate portion fixing portion is fixed to the plate portion in a state of being accommodated in the accommodation hole.

7. The optical element according to claim 1, wherein the holder is made of a magnetic material.

8. An optical scanning device comprising;
   the optical element according to claim 1;
   a frame portion that supports the shaft so as to be swingable about the first axis; and
   a fixed portion that supports the frame portion to be swingable about a second axis perpendicular or substantially perpendicular to the first axis and defines a magnetic circuit with the magnet.

* * * * *